US012225654B2

(12) United States Patent
Fukui et al.

(10) Patent No.: US 12,225,654 B2
(45) Date of Patent: Feb. 11, 2025

(54) MICROWAVE HEATING DEVICE

(71) Applicant: Panasonic Intellectual Property Management Co., Ltd., Osaka (JP)

(72) Inventors: Mikio Fukui, Shiga (JP); Takashi Uno, Shiga (JP); Fumitaka Ogasawara, Hyogo (JP); Motoyoshi Iwata, Osaka (JP); Shinji Takano, Kyoto (JP); Daisuke Hosokawa, Shiga (JP); Masayoshi Hiramoto, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 929 days.

(21) Appl. No.: 17/261,920

(22) PCT Filed: Sep. 11, 2019

(86) PCT No.: PCT/JP2019/035646
§ 371 (c)(1),
(2) Date: Jan. 21, 2021

(87) PCT Pub. No.: WO2020/054754
PCT Pub. Date: Mar. 19, 2020

(65) Prior Publication Data
US 2021/0329749 A1 Oct. 21, 2021

(30) Foreign Application Priority Data
Sep. 14, 2018 (JP) ................................ 2018-172001

(51) Int. Cl.
*H05B 6/70* (2006.01)
*H05B 6/68* (2006.01)

(52) U.S. Cl.
CPC ............ *H05B 6/702* (2013.01); *H05B 6/686* (2013.01); *H05B 6/707* (2013.01)

(58) Field of Classification Search
CPC ........ H05B 6/702; H05B 6/686; H05B 6/707; H05H 2007/027; H05H 2242/24
(Continued)

(56) References Cited

U.S. PATENT DOCUMENTS 2,509,419 A * 5/1950 Brown .................. H01J 25/587 313/247
3,748,528 A * 7/1973 Cronson .................. H03K 3/80 307/106
(Continued)

FOREIGN PATENT DOCUMENTS

JP 6-275345 9/1994
JP 2002-198129 7/2002
(Continued)

OTHER PUBLICATIONS

Title: "A Wideband Millimeter-wave Coaxial to Rectangular Waveguide Transition Structure" on Microwave Journal by Yan Zhou website: https://www.microwavejournal.com/articles/10826-a-wideband-millimeter-wave-coaxial-to-rectangular-waveguide-transition-structure (Year: 2011).*
(Continued)

*Primary Examiner* — Eric S Stapleton
*Assistant Examiner* — Yeong Juen Thong
(74) *Attorney, Agent, or Firm* — Wenderoth, Lind & Ponack, L.L.P.

(57) ABSTRACT

A microwave heating device includes: a heating chamber for accommodating a heating target object, a microwave generator for generating a microwave, and a coaxial connector. The coaxial connector includes a center conductor, an insulator, and an external conductor. The center conductor is connected to an output terminal of the microwave generator. An air gap is defined between the center conductor and the insulator.

2 Claims, 3 Drawing Sheets

(58) Field of Classification Search
USPC .............................................. 219/746; 315/39
See application file for complete search history.

(56) References Cited

U.S. PATENT DOCUMENTS

| | | | | |
|---|---|---|---|---|
| 4,700,716 | A | 10/1987 | Kasevich et al. | |
| 4,808,784 | A * | 2/1989 | Ko | H05B 6/707 219/746 |
| 2007/0068909 | A1 * | 3/2007 | Karasawa | H05B 6/68 219/121.43 |
| 2016/0163494 | A1 * | 6/2016 | Kato | H01J 23/04 315/39.67 |
| 2017/0306918 | A1 * | 10/2017 | Ikeda | F02B 43/10 |
| 2019/0181577 | A1 | 6/2019 | Takakuwa et al. | |
| 2020/0015327 | A1 * | 1/2020 | Kuchler | H05B 6/70 |

FOREIGN PATENT DOCUMENTS

| | | |
|---|---|---|
| JP | 2008-034166 | 2/2008 |
| WO | 98/41799 | 9/1998 |
| WO | 2018/037684 | 3/2018 |

OTHER PUBLICATIONS

Extended European Search Report issued Dec. 22, 2021 in corresponding European Patent Application No. 19859728.8.
International Search Report of PCT application No. PCT/JP2019/035646 dated Dec. 10, 2019.
Extended European Search Report issued Oct. 8, 2021 in European Patent Application No. 19859728.8.

* cited by examiner

MICROWAVE HEATING DEVICE

CROSS-REFERENCE TO RELATED APPLICATIONS

This application is a U.S. national stage application of the PCT International Application No. PCT/JP2019/035646 filed on Sep. 11, 2019, which claims the benefit of foreign priority of Japanese patent application 2018-172001 filed on Sep. 14, 2018, the contents all of which are incorporated herein by reference.

TECHNICAL FIELD

The present disclosure relates to a microwave heating device.

BACKGROUND ART

In recent years, microwave heating devices that include a microwave generator composed of a semiconductor device instead of a magnetron have been developed. Such a microwave heating device generally includes a coaxial connector placed in the power path extending between the microwave generator and the heating chamber (e.g., Japanese Unexamined Patent Application Publication No. 6-275345).

SUMMARY OF THE INVENTION

In these microwave heating devices known in the art, the output terminal of the microwave generator is connected to the center conductor of the coaxial connector by, for example, soldering, and the external conductor of the coaxial connector is attached to the outer shell of the microwave generator.

In general, the center conductor of the coaxial connector is held by the insulator placed between the external conductor and the center conductor itself. In this structure, the center conductor of the coaxial connector is expanded by the heat generated by the microwave generator. This imposes a stress on the soldered joint between the microwave generator and the center conductor of the coaxial connector, possibly causing cracking.

The microwave heating device according to an aspect of the present disclosure includes the following components: a heating chamber configured to accommodate a heating target object, a microwave generator that generates a microwave, and a coaxial connector. The coaxial connector includes a center conductor, an insulator, and an external conductor. The center conductor is connected to the output terminal of the microwave generator. The coaxial connector includes an air gap between the center conductor and the insulator.

This aspect can reduce the occurrence of cracking of the soldered joint between the microwave generator and the coaxial connector, thereby improving the reliability of the microwave heating device.

DESCRIPTION OF EMBODIMENTS

The microwave heating device according to the first aspect of the present disclosure includes the following components: a heating chamber configured to accommodate a heating target object, a microwave generator configured to generate a microwave, a waveguide, and a coaxial connector. The waveguide is mounted with the microwave generator, and includes one end connected to the heating chamber. The coaxial connector includes a center conductor, an insulator, and an external conductor. The microwave generator includes a substrate mounted with an oscillator system. The center conductor includes one end connected to the substrate of the microwave generator and another end projecting into the waveguide. The one end of the center conductor is closer to the microwave generator, and the another end is closer to the waveguide. The coaxial connector includes an air gap between the center conductor and the insulator.

In the microwave heating device according to the second aspect of the present disclosure, in addition to the first aspect, the coaxial connector further includes a positioning member projecting from a surface of the insulator, thereby supporting the center conductor. The air gap includes discontinuous spaces partitioned by the positioning member.

In the microwave heating device according to the third aspect of the present disclosure, in addition to the first aspect, the air gap has a dimension in the range of 0.4 mm to 0.8 mm, inclusive.

The exemplary embodiment of the present disclosure will now be described with reference to the drawings.

Figure 1:
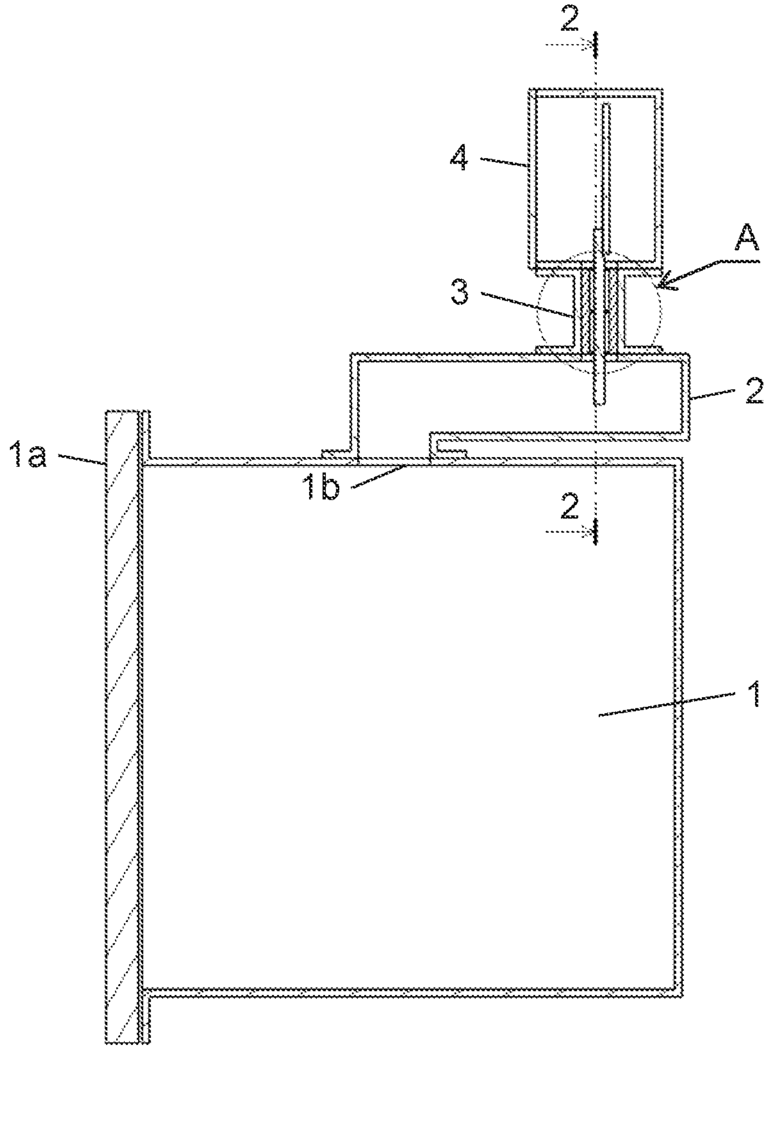
FIG. 1 is a sectional view of a microwave heating device according to an exemplary embodiment of the present disclosure.
Figure 2:
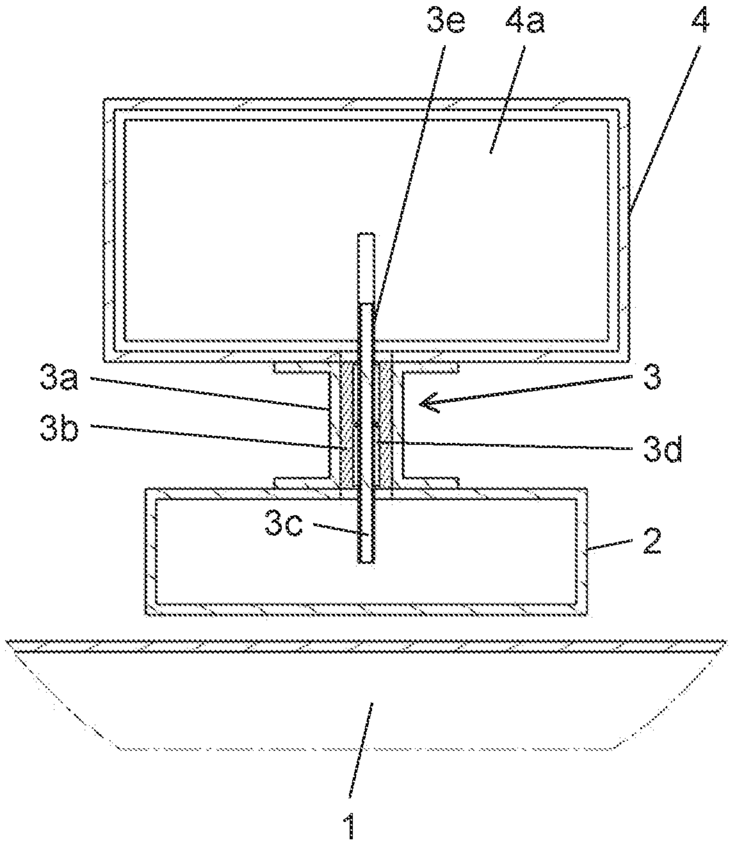
FIG. 2 is a sectional view of the microwave heating device taken along line 2-2 in FIG. 1.
Figure 3:
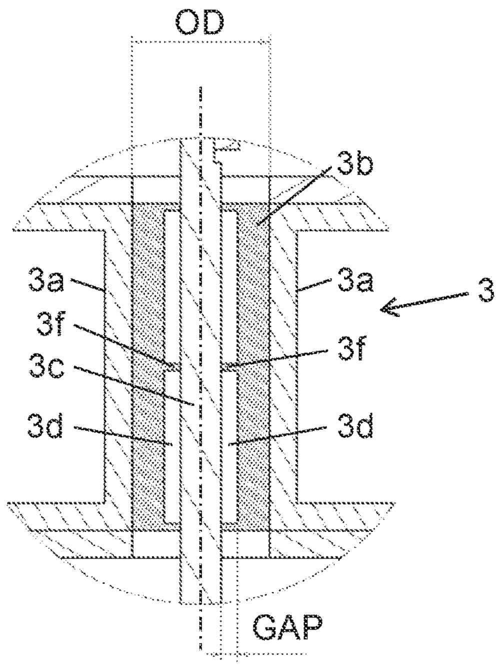
FIG. 3 is a partially enlarged view of area A in FIG. 1.

FIG. 1 is a sectional view of a microwave heating device according to the exemplary embodiment. FIG. 2 is a sectional view of the microwave heating device taken along line 2-2 in FIG. 1. FIG. 3 is a partially enlarged view of area A in FIG. 1.

As shown in FIG. 1, the microwave heating device of the exemplary embodiment includes heating chamber 1 for accommodating a heating target object. Heating chamber 1 has door 1*a* at its front opening. The top surface of heating chamber 1 is mounted with waveguide 2 of a rectangular cross section.

Waveguide 2 has a bent shape consisting of the following: a horizontal portion extending almost horizontally along the top surface of heating chamber 1, and a vertical portion extending almost vertically. One end of waveguide 2 is connected to heating chamber 1 through power-feeding port 1*b* formed at the top surface of heating chamber 1, and the other end of waveguide 2 is closed. The upper surface of the horizontal portion of waveguide 2 is mounted with microwave generator 4 via coaxial connector 3.

As shown in FIGS. 2 and 3, coaxial connector 3 includes external conductor 3*a*, insulator 3*b*, and center conductor 3*c*. External conductor 3*a* supports insulator 3*b*. Coaxial connector 3 further includes flange-like positioning member 3*f*, which is placed between insulator 3*b* and center conductor 3*c* in such a manner as to project from the surface of insulator 3*b*. Insulator 3*b* supports center conductor 3*c* via positioning member 3*f*. Coaxial connector 3 has air gap 3*d* between center conductor 3*c* and insulator 3*b* excluding positioning member 3*f*. The end of center conductor 3*c* that is closer to waveguide 2 projects into waveguide 2 and functions as an antenna.

Microwave generator 4 includes substrate 4*a* mounted with an oscillator system composed of a semiconductor device. The oscillator system generates an electromagnetic wave with a frequency (e.g., 2.45 GHz), within the frequency range of the microwave. Coaxial connector 3 further includes soldered joint 3*e* connecting substrate 4*a* and the end of center conductor 3*c* that is closer to microwave generator 4.

In FIGS. 2 and 3, air gap 3*d* is composed of two discontinuous spaces. In the present disclosure, however, air gap 3*d* may alternatively be a single continuous space.

In the microwave heating device according to the exemplary embodiment, the microwave power generated on substrate 4*a* travels through coaxial connector 3 and waveguide 2 and is radiated into heating chamber 1 through power-feeding port 1*b*.

Figure 4:
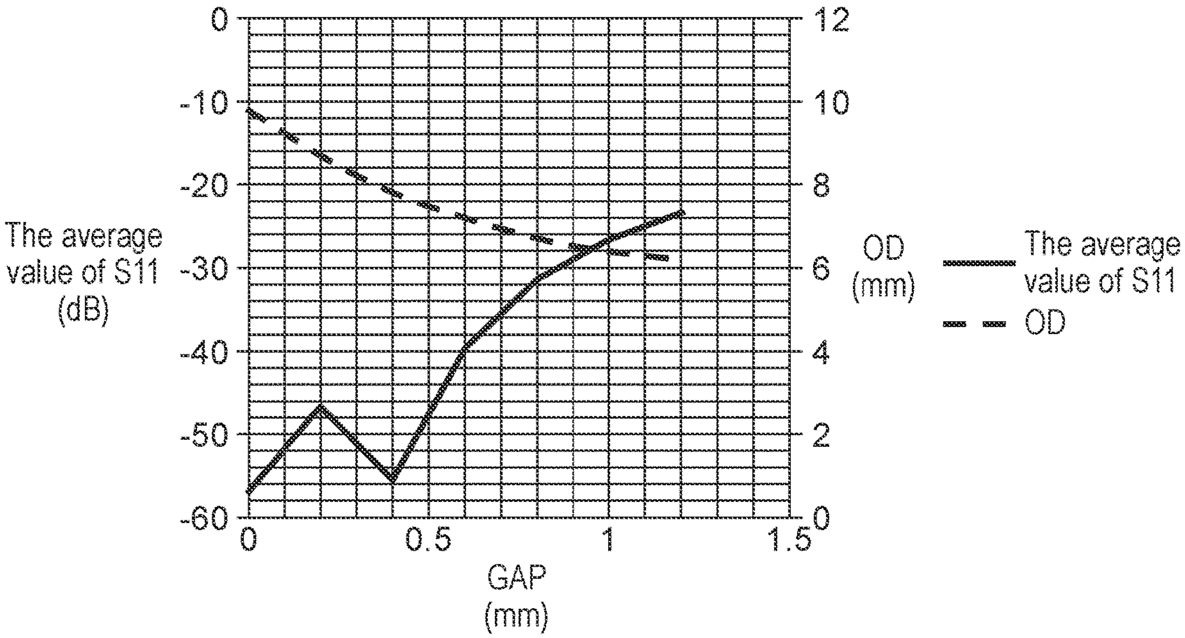
FIG. 4 is a graph showing the analytical results of the electromagnetic field generated when the coaxial connector transmits the microwave.

FIG. 4 is a graph showing the analytical results of the electromagnetic field generated when coaxial connector 3 transmits the microwave. More specifically, FIG. 4 shows the reflection coefficient S11 (dB) and the optimum outer dimension OD (mm) of insulator 3*b* with respect to the dimension GAP (mm) of air gap 3*d* shown in FIG. 3. As the reflection coefficient S11 is smaller, the reflected power decreases, thereby achieving excellent transmission conditions.

As shown in FIG. 4, as the dimension GAP of air gap 3*d* increases, he reflection coefficient S11 increases and the outer dimension OD of insulator 3*b* decreases. The reflection coefficient S11 is calculated by the following formula:

$$S11\ (\text{dB}) = 10 \times \log\ (\text{reflected power}/\text{incident power})$$

When the reflection coefficient S11 is −30 dB, the ratio of the reflected power with respect to the incident power is 0.1%. In general, when the reflection coefficient S11 is lower than −30 dB, the reflected power does not practically matter.

In the exemplary embodiment, the outer dimension OD of insulator 3*b* is set in such a manner that the reflection coefficient S11 is below −30 dB. This causes the reflected power to be equal to or less than $1/1000$ of the incident power. The contact area between center conductor 3*c* and insulator 3*b* is minimized, and center conductor 3*c* is left unfixed in waveguide 2.

In the exemplary embodiment, the internal stress caused by the thermal expansion of center conductor 3*c* can be released toward waveguide 2. This results in reducing the stress on soldered joint 3*e*. In particular, setting the dimension GAP of air gap 3*d* to the range of 0.4 mm to 0.8 mm can reduce the stress on soldered joint 3*e* without increasing the reflected power.

As shown in FIG. 4, the outer dimension OD of insulator 3*b* can be smaller than it is when the dimension GAP of air gap 3*d* is 0 mm. This enables reducing the outer dimension of coaxial connector 3.

The exemplary embodiment can reduce the occurrence of cracking of the soldered joint between microwave generator 4 and coaxial connector 3, thereby improving the reliability of the microwave heating device.

INDUSTRIAL APPLICABILITY

As described above, the present disclosure is applicable to microwave heating devices such as microwave ovens, plasma generators, and dryers.

REFERENCE MARKS IN THE DRAWINGS

1 heating chamber
1*a* door
1*b* power-feeding port
2 waveguide
3 coaxial connector
3*a* external conductor
3*b* insulator
3*c* center conductor
3*d* air gap
3*e* soldered joint
3*f* positioning member
4 microwave generator
4*a* substrate

The invention claimed is:

1. A microwave heating device comprising:

a heating chamber configured to accommodate a heating target object;

a microwave generator including a substrate, the microwave generator being configured to generate a microwave onto the substrate;

a waveguide mounted with the microwave generator; and a coaxial connector including a center conductor, an insulator, an external conductor, and a positioning member, wherein:

one end of the waveguide is connected to the heating chamber;

the center conductor is a single conductor including a first end and a second end, the first end being connected to the substrate of the microwave generator and the second end projecting into the waveguide;

the first end of the center conductor is closer to the microwave generator;

the second end of the center conductor is closer to the waveguide;

an air gap is defined between the center conductor and the insulator;

the positioning member includes a first flange, a second flange, and a third flange;

the first flange projects from a first part of a surface of the insulator and contacts a first part of the center conductor;

the second flange projects from a second part of the surface of the insulator and contacts a second part of the center conductor;

the third flange projects from a third part of the surface of the insulator and contacts a third part of the center conductor; and the air gap includes: (i) a first space between the first flange and the second flange; and (ii) a second space between the second flange and the third flange.

2. The microwave heating device according to claim 1, wherein a width of the air gap is in a range of 0.4 mm to 0.8 mm, inclusive.

* * * * *